(12) United States Patent  
Kraus

(10) Patent No.: US 11,653,677 B2
(45) Date of Patent: May 23, 2023

(54) EXTREME CROP PROCESSING AFTER ENSILING

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 480 days.

(21) Appl. No.: 16/776,847

(22) Filed: Jan. 30, 2020

(65) Prior Publication Data

US 2021/0235726 A1  Aug. 5, 2021

(51) Int. Cl.
*A23K 50/10* (2016.01)
*A23K 10/30* (2016.01)
*A23K 10/12* (2016.01)
*A01D 90/12* (2006.01)

(52) U.S. Cl.
CPC .............. *A23K 50/10* (2016.05); *A01D 90/12* (2013.01); *A23K 10/12* (2016.05); *A23K 10/30* (2016.05)

(58) Field of Classification Search
None
See application file for complete search history.

(56) References Cited

U.S. PATENT DOCUMENTS

| 4,265,076 A | 5/1981 | Krutz |
| 5,152,127 A * | 10/1992 | Koegel .................. A01D 82/00 56/14.1 |
| 5,950,406 A | 9/1999 | Koegel et al. |
| 10,306,840 B1 * | 6/2019 | Mueller .................. A01F 25/13 |

FOREIGN PATENT DOCUMENTS

| DE | 3425875 A1 | 1/1986 |
| EP | 0223004 A1 | 5/1987 |
| GB | 2159489 A | 12/1985 |
| WO | WO9510176 A1 | 4/1995 |

OTHER PUBLICATIONS

Extended European Search Report and Written Opinion issued in European Patent Application No. 21153128.0, dated Jun. 22, 2021, in 07 pages.

\* cited by examiner

*Primary Examiner* — Nghi V Nguyen

(57) ABSTRACT

A method of preparing includes storing cut crop material in an accumulation having an oxygen barrier. The cut crop material ferments within the accumulation to form a silage material. After the fermentation of the silage material, the silage material is mechanically macerated with a macerator, and then fed to ruminant animals.

14 Claims, 2 Drawing Sheets

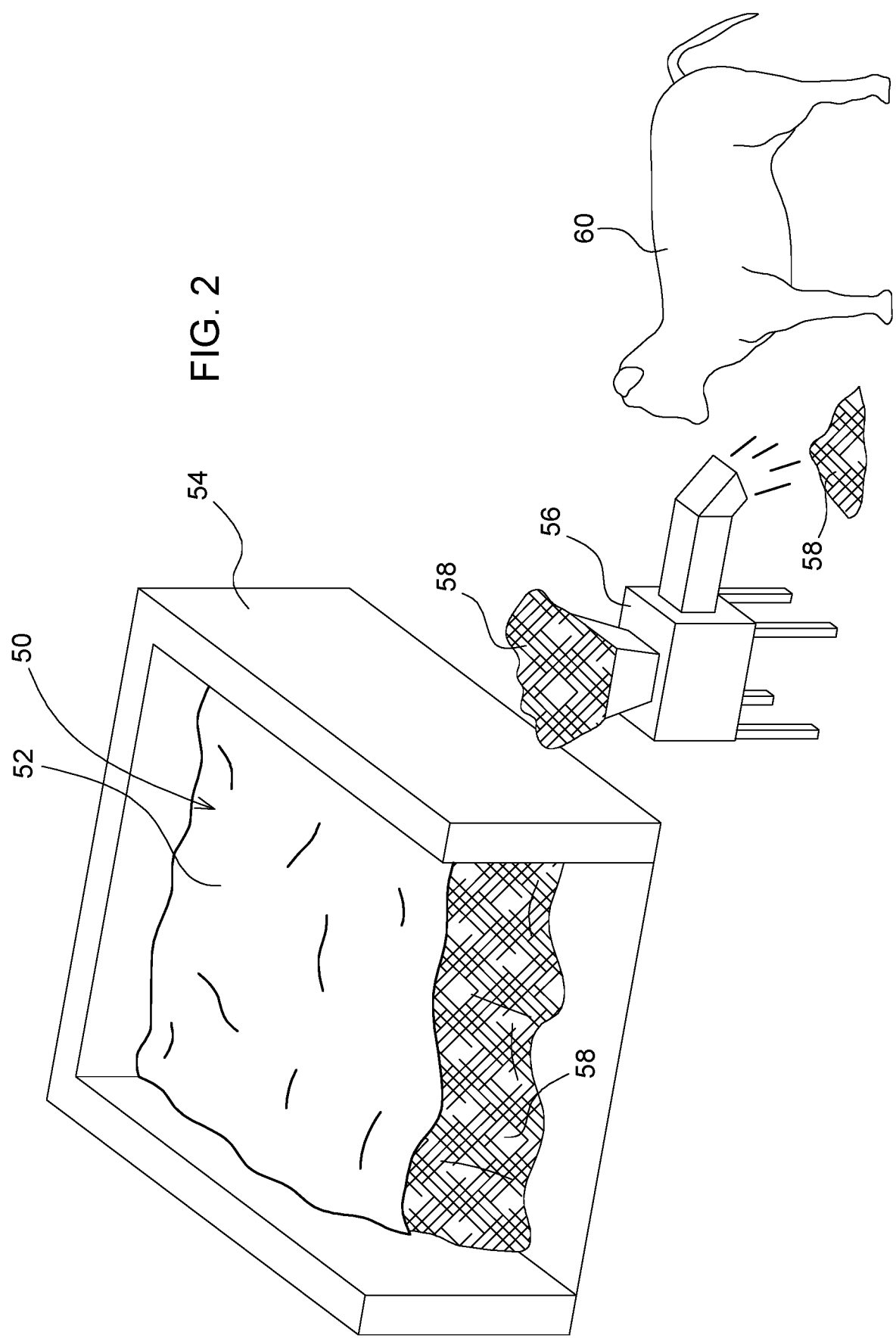

EXTREME CROP PROCESSING AFTER ENSILING

TECHNICAL FIELD

The disclosure generally relates to a method of preparing silage.

BACKGROUND

Forages, such as but not limited to, grasses, legumes, maize, crop residues, etc., are commonly harvested and fed to ruminant animals. One common practice for storing these forage materials is to harvest the forage and place the forage in an oxygen limiting structure, such as a bunker silo, a tightly wrapped bale, or a tower silo. The forage material ferments within the oxygen limiting structure, thereby preserving the forage material. The forage may then be removed and fed to the animals on an as-needed basis. This forage preservation process is often referred to as ensilage, and the forage material is often referred to as silage.

Research has shown that digestibility of forage materials may be improved by extremely processing the forage material prior to feeding the forage material to the animals. This extreme processing is referred to as maceration. Increased digestibility of the forage materials due to maceration increases the amount of nutrients absorbed by the animal for a given volume of forage. The increase in nutrient absorption results in increased production for the given volume of forage, e.g., increased milt production in dairy cattle. However, maceration at the time of harvesting the crop material is not practical because the energy required to macerate the forage material at a volume and speed sufficient to keep up with typical harvesting operations is too great for standard agricultural equipment to supply.

SUMMARY

A method of preparing silage is provided. The method includes storing cut crop material in an accumulation having an oxygen barrier. The cut crop material ferments within the accumulation to form a silage material. After the fermentation of the silage material, the silage material is mechanically macerated with a macerator.

In one aspect of the disclosure, macerating the silage material includes high intensity crop processing of the silage material resulting in cell wall rupture and the release of intracellular solubles of the silage material. As understood by those in the art, intracellular solubles may include, but are not limited to, water, sugars, phytoplasma, etc. The macerator employs a mechanical process, such as but not limited to, beating, chipping, crushing, bending, cracking, scraping, shearing, etc., to macerate the silage material.

In one aspect of the disclosure, harvesting the crop material includes cutting standing crop material in a field to provide the cut crop material. The cut crop material may then be dried in the field to achieve a desired initial moisture content. Once the desired initial moisture content is achieved, the cut crop material may be raked into a windrow and collected in the field. The cut crop material may be chopped or cut into smaller pieces while collecting the cut crop material in the field.

In one aspect of the disclosure, the accumulation includes one of a bale wrapped with an oxygen barrier, a bunker silo covered with an oxygen barrier or an oxygen limiting tower silo. The oxygen barrier may include, but is not limited to, a plastic sheet or covering operable to block the movement of oxygen therethrough.

In one aspect of the disclosure, after maceration of the silage material, the silage material is then fed to an animal. In one embodiment, the silage material is macerated immediately prior to feeding the silage material to the animal. As such, the silage material is removed from the accumulation and macerated on an as-needed basis, and then subsequently fed to the animals.

Accordingly, because the silage material may be removed from the accumulation and macerated on an as-needed feed basis, the mechanical macerator may be configured to operate at a slower speed requiring much less energy then when macerating the crop material during harvesting. As such, the power limitations of the agricultural vehicles and/or equipment used to harvest the crop material do not limit or preclude the maceration of the crop material. For this reason, because the volume of silage material to be macerated at a given feed cycle is based on the actual feed requirements of the animals, and not on the speed and/or volume of the harvest operation, a smaller and more energy efficient macerator may be used.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 is a schematic perspective view showing a bunker silo with a mechanical macerator.

DETAILED DESCRIPTION

Figure 1:
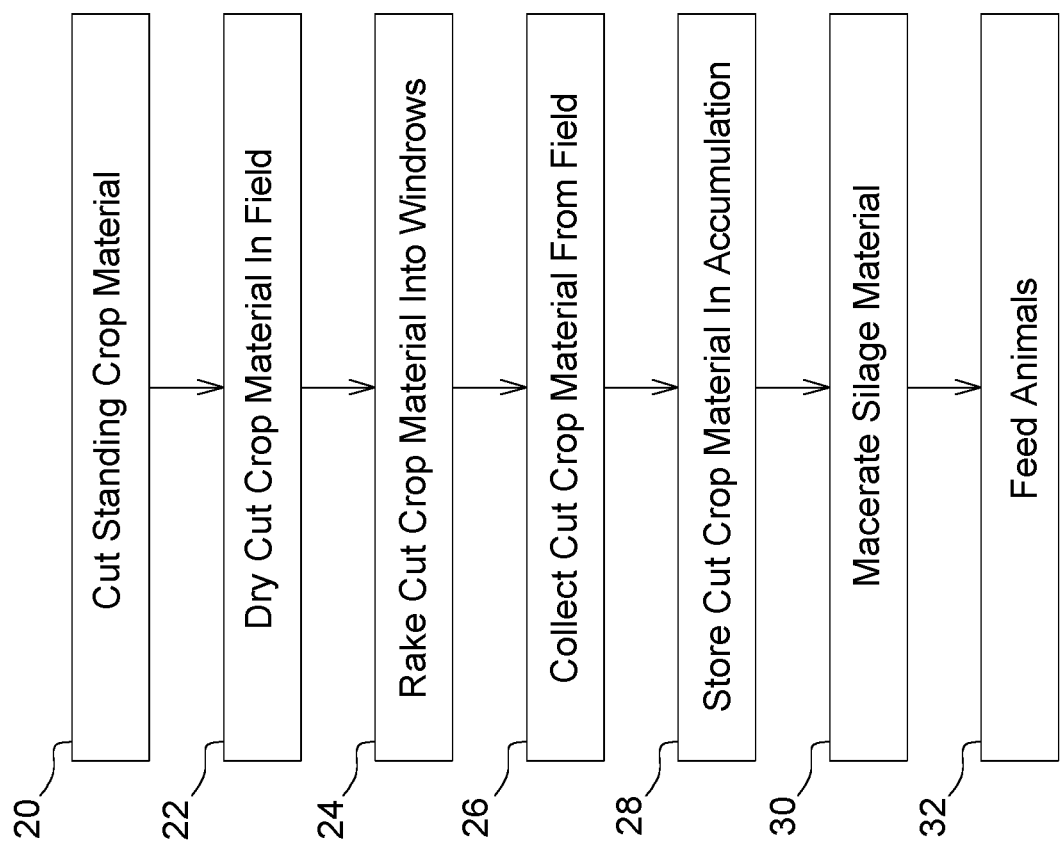
FIG. 1 is a flowchart representing a method of preparing silage.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Referring to the Figures, wherein like numerals indicate like parts throughout the several views, a method of preparing silage is described herein. As understood by those skilled in the art, "silage" is a type of fodder or forage material made from green foliage crops that have been preserved by acidification. The acidification is achieved through a fermentation process. Silage may be fed to ruminant animals 60, such as but not limited to cattle, sheep goats, buffalo, deer, etc. The green foliage crops used to make silage may include, but are not limited to, grasses, alfalfa, maize, sorghum, or other cereal plants.

The process of preparing the silage begins by cutting standing crop material in a field to provide a cut crop material. The step of cutting the standing crop material is generally indicated by box 20 in FIG. 1. The standing crop material may be cut using conventional crop mowing equipment, such as but not limited to, a rotary mower, a rotary bar mower, a sickle mower, etc. The mower may be drawn behind or pushed ahead of a vehicle, such as but not limited to an agricultural tractor. Alternatively, the mower may be mounted to a self-propelled windrower. It should be appreciated that the standing crop material may be cut using equipment other than described herein.

After the standing crop material has been cut, the cut crop material may be allowed to dry in the field to achieve a desired initial moisture content. The step of drying the cut crop material in the field is generally indicated by box 22 in FIG. 1. The desired initial moisture content may vary based on the type of crop material and the manner in which the cut crop material is stored, described in greater detail below. Generally, the desired initial moisture content is between 50% and 75%. However, it should be appreciated that the desired initial moisture content may vary from the range described herein.

After allowing the cut crop material to dry to the desired initial moisture content, the cut crop material may be raked into a windrow. The step of raking the cut crop material into a windrow is generally indicated by box 24 in FIG. 1. It should be appreciated that the cut crop material may be formed into the windrow during the cutting process. If the cut crop material is raked into the windrows after drying, the cut crop material may be raked into the windrows using conventional raking equipment, such as but not limited to, a wheel rake, a rotary rake, or a parallel bar or basket rake. The rake may be drawn by a vehicle, such as but not limited to an agricultural tractor. It should be appreciated that the cut crop material may be raked into a windrow using equipment other than described herein.

The cut crop material may then be collected in the field. The step of collecting the cut crop material in the field is generally indicated by box 26 in FIG. 1. The cut crop material may be collected from the field using conventional equipment, such as but not limited to, a forage harvester and a trailer. The trailer may be drawn by another vehicle, such as but not limited to a tractor. The forage harvester gathers the cut crop material up from the field, and moves the cut crop material through a discharge chute, which discharges the cut crop material into the trailer. Once loaded into the trailer, the cut crop material may be moved to another location for storage.

In addition to collecting the cut crop material, the forage harvester may include a crop processing unit that chops or further cuts the crop material into smaller pieces. As such, the cut crop material may be further cut or chopped while collecting the cut crop material in the field. It should be appreciated that the cut crop material may be collected from the field using equipment other than described herein.

Referring to FIG. 2, the cut crop material may then be stored in an accumulation 50 having an oxygen barrier 52. The step of storing the cut crop material in the accumulation 50 is generally indicated by box 28 in FIG. 1. The accumulation 50 may include configuration that restricts or limits oxygen infiltration into the accumulation 50. For example, the accumulation 50 may include a pile of crop material disposed in a bunker silo 54 (shown in FIG. 2), a pile of crop material stored in a tower silo, or a compressed bale. As is understood by those skilled in the art, a bunker silo 54 generally includes a concrete floor with walls formed on three sides. The cut crop material is piled onto the concrete floor in layers and then compressed to remove as much air from the cut crop material in the bunker silo 54 as reasonably possible. After the cut crop material is compressed, the pile or accumulation 50 of the cut crop material is covered with the oxygen barrier 52. As is understood by those skilled in the art, the cut crop material may be formed into a compressed bale. The bale may be formed into a shape, such as but not limited to a parallelepiped rectangular shape, e.g., a large square bale, or a cylindrical shape, e.g., a round bale. The cut crop material may be formed into the compressed bale using a round baler, a large square baler, or some other similar baler know to those skilled in the art. Once formed and bound into the bale, the cut crop material may then be wrapped with the oxygen barrier 52 as is known in the art. A tower silo may alternatively be used, in which the tower silo fully encloses the crop material and also acts as the oxygen barrier to by blocking air from the crop material within the tower silo.

The oxygen barrier 52 may include a product that is capable substantially blocking or limiting the flow of air. In one implementation, the oxygen barrier 52 is a plastic covering operable to block transfer of oxygen therethrough. The plastic covering may include, but is not limited to, a polyethylene plastic or other similar or equivalent plastic covering. In other embodiments, the oxygen barrier is a wall or roof of a structure that blocks transfer or passage of air and/or oxygen therethrough.

With the cut crop material disposed in the accumulation 50 and covered with the oxygen barrier 52, the cut crop material will ferment within the accumulation 50 to form a silage material 58. The fermentation process of silage is understood by those skilled in the art. Generally described, the fermentation process involves both aerobic bacteria (oxygen needed) and anaerobic bacteria (no oxygen needed). Aerobic fermentation occurs when the cut crop material is positioned in the accumulation 50 and/or immediately thereafter, i.e. placed in the bunker silo 54 or formed into the bale. The aerobic fermentation consumes what oxygen is available in the accumulation 50. After the aerobic fermentation has consumed the oxygen in the accumulation 50, then the anaerobic fermentation occurs. The complete fermentation process may take approximately two weeks to complete, after which the silage material 58 may be stored in the accumulation 50 in a generally stable condition for an extended period of time, assuming the introduction of oxygen into the accumulation 50 is substantially prevented during the extended storage.

After fermentation, the silage material 58 is macerated. The step of macerating the silage material 58 is generally indicated by box 30 in FIG. 1. The silage material 58 is macerated with a mechanical macerator 56, shown in FIG. 2. As understood by those skilled in the art, "macerating" or "maceration" is a highly intensive mechanical crop conditioning process in which the physical structure of plant stems are broken down and split into numerals pieces while the leaves and upper stem segments are crushed and pureed, resulting in significant cell wall rupture and the release of intracellular solubles. For example, the degree of cell wall rupture for macerated silage material 58 may be between 40% and 80%. As is understood by those skilled in the art, maceration is a much more intensive and extreme form of crop processing than the typical crop conditioning that occurs in traditional crop conditioning units commonly disposed on mowers and other crop cutting implements. As such, it should be appreciated that the maceration of the silage material 58 described herein is different and more extensive than, and is not the equivalent of, a typical crop conditioning process that may occur at the time of cutting the crop material that is intended to be dried and made into dry hay or the like.

The mechanical macerator 56 may include a device that macerates the silage material 58 through a mechanical process, such as but not limited to, beating, chipping, crushing, bending, cracking, scraping, or shearing the silage material 58. The mechanical macerator 56 may include, for example, one or more macerating plates or rollers that move relative to each other, and pass the silage material 58 therebetween, whereby the silage material 58 is macerated. The mechanical macerator 56 may include a power input, such as but not limited to a rotary power input that drives a gear train, or an electric input that drives an electric motor, a hydraulic input that drives a hydraulic motor etc. The power input in turn drives the macerating plates and/or rollers for macerating the silage material 58. It should be appreciated that the mechanical macerator 56 may include other components not described herein, and that the specific construction, configuration, and operation of the mechanical macerator 56 are not pertinent to the teachings of this disclosure, are understood by those skilled in the art, and are therefore not described in detail herein.

After macerating the silage material 58, the macerated silage material 58 may then be fed to an animal 60. The step of feeding the animal 60 is generally indicated by box 32 in FIG. 1. Typically, the silage material 58 is fed to a ruminant animal 60, such as but not limited to, cattle, sheep goats, buffalo, deer, etc. In one implementation, the macerated silage material 58 is fed to the animal 60 immediately after the maceration process. Because the maceration process occurs after fermentation, and immediately before being fed to the animal 60, the amount of the silage material 58 that is removed from the accumulation 50 and macerated may be limited to the amount of feed required for each individual feeding. For this reason, the size of the mechanical macerator 56 may be limited to that required to process a volume of the silage material 58 for an individual feeding within a reasonable amount of time. By reducing the size and speed at which the mechanical macerator 56 macerates the silage material 58, the energy required to operate the mechanical macerator 56 may also be reduced, making the maceration of silage material 58 more cost effective when compared to macerating the crop material at the time of cutting.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of preparing silage, the method comprising:
   storing cut crop material in an accumulation having an oxygen barrier;
   fermenting the cut crop material within the accumulation to form a silage material; and
   macerating the silage material after fermentation with a mechanical macerator.

2. The method set forth in claim 1, wherein macerating the silage material includes high intensity crop processing of the silage material resulting in cell wall rupture and the release of intracellular solubles of the silage material.

3. The method set forth in claim 1, further comprising cutting standing crop material in a field to provide the cut crop material.

4. The method set forth in claim 1, further comprising drying the cut crop material in the field to achieve a desired initial moisture content.

5. The method set forth in claim 1, further comprising raking the cut crop material into a windrow.

6. The method set forth in claim 1, further comprising collecting the cut crop material in the field.

7. The method set forth in claim 6, further comprising chopping the cut crop material while collecting the cut crop material in the field.

8. The method set forth in claim 1, further comprising feeding the silage material to an animal after macerating the silage material.

9. The method set forth in claim 1, wherein the accumulation having the oxygen barrier includes one of a bale wrapped with the oxygen barrier, a bunker silo covered with the oxygen barrier, or an oxygen limiting tower silo.

10. The method set forth in claim 1, wherein the oxygen barrier is a plastic covering operable to block transfer of oxygen therethrough.

11. A method of preparing silage, the method comprising:
    cutting standing crop material in a field to provide the cut crop material;
    drying the cut crop material in the field to achieve a desired initial moisture content;
    chopping the cut crop material;
    collecting the cut crop material in the field;
    storing cut crop material in an accumulation having an oxygen barrier;
    fermenting the cut crop material within the accumulation to form a silage material;
    mechanically macerating the silage material after fermentation with a macerator; and
    feeding the silage material to an animal after macerating the silage material.

12. The method set forth in claim 11, wherein macerating the silage material includes high intensity crop processing of the silage material resulting in cell wall rupture and the release of intracellular solubles of the silage material.

13. The method set forth in claim 11, wherein the accumulation having the oxygen barrier includes one of a bale wrapped with the oxygen barrier, a bunker silo covered with the oxygen barrier, or an oxygen limiting tower silo.

14. The method set forth in claim 11, wherein the oxygen barrier is a plastic covering operable to block transfer of oxygen therethrough.

* * * * *